US009309904B2

(12) United States Patent
Loringer et al.

(10) Patent No.: US 9,309,904 B2
(45) Date of Patent: Apr. 12, 2016

(54) SYSTEM, TRANSITION CONDUIT, AND ARTICLE OF MANUFACTURE FOR TRANSITIONING A FLUID FLOW

(75) Inventors: Daniel Edward Loringer, Lawrence Park, PA (US); Lukas William Johnson, Lewis Center, OH (US); Kendall Swenson, Eureka, CA (US); Rodrigo Rodriguez Erdmenger, Garching (DE)

(73) Assignee: General Electric Company, Schenectady, NY (US)

( * ) Notice: Subject to any disclaimer, the term of this patent is extended or adjusted under 35 U.S.C. 154(b) by 799 days.

(21) Appl. No.: 13/609,700

(22) Filed: Sep. 11, 2012

(65) Prior Publication Data

US 2014/0069541 A1    Mar. 13, 2014

(51) Int. Cl.
*F16L 55/027*    (2006.01)
*F15D 1/02*    (2006.01)
*F01N 13/18*    (2010.01)
*F02B 37/013*    (2006.01)

(52) U.S. Cl.
CPC .............. *F15D 1/02* (2013.01); *F01N 13/1811* (2013.01); *F01N 13/1844* (2013.01); *F01N 13/1872* (2013.01); *F02B 37/013* (2013.01); *Y02T 10/144* (2013.01)

(58) Field of Classification Search
CPC ............ F01N 13/1811; F01N 13/1844; F01N 13/1872; F02B 37/013; F15D 1/02
USPC ........... 415/201, 202, 208.1, 212.1; 60/605.2, 60/612
See application file for complete search history.

(56) References Cited

U.S. PATENT DOCUMENTS

| 4,288,988 | A  | * | 9/1981 | Curtil ........................... 60/605.1 |
| 4,776,168 | A  | * | 10/1988 | Woollenweber ................ 60/602 |
| 7,032,383 | B2 |  | 4/2006 | Weber |
| 2004/0079079 | A1 | * | 4/2004 | Martin et al. ................ 60/605.2 |
| 2007/0169479 | A1 | * | 7/2007 | Nicolle et al. .................. 60/612 |
| 2007/0283698 | A1 | * | 12/2007 | Chen ........................... 60/605.1 |
| 2012/0227400 | A1 | * | 9/2012 | Erdmenger et al. ............ 60/612 |

* cited by examiner

*Primary Examiner* — Igor Kershteyn
*Assistant Examiner* — Woody A Lee, Jr.
(74) *Attorney, Agent, or Firm* — GE Global Patent Operation; John A. Kramer (57) ABSTRACT

Various systems and apparatuses are provided for a fluid transfer system for an engine. In one example, a system includes a first turbine having an exit for discharging a main fluid flow and a second turbine having an inlet for receiving at least a portion of the main fluid flow. A main conduit fluidically couples the exit of the first turbine to the inlet of the second turbine. A transition conduit is coupled with the main conduit and includes a volute passageway curving around the main conduit. The volute passageway includes a slot that follows a route around the curving volute passageway and opens into an interior of the main conduit. The slot is defined at least in part by a lip and establishes a path for either a secondary fluid flow to enter the main conduit or a portion of a main fluid flow to exit the main conduit.

17 Claims, 7 Drawing Sheets

FIG. 6

SYSTEM, TRANSITION CONDUIT, AND ARTICLE OF MANUFACTURE FOR TRANSITIONING A FLUID FLOW

FIELD

Embodiments of the invention relate to flow transition systems for an engine. Other embodiments relate to apparatuses and articles of manufacture for introducing a secondary fluid flow into a fluid carrier and/or extracting a portion of a main fluid flow from a fluid carrier.

BACKGROUND

Engine systems may include one or more turbochargers or other turbine-based systems. In some examples, turbocharger systems may include two turbochargers configured in series, such as a high pressure turbocharger fluidically coupled to a low pressure turbocharger. To control the boost pressure generated by the high pressure compressor, a bypass valve upstream from the high pressure turbine may be utilized to divert and bypass exhaust flow around the high pressure turbine. In one example, the diverted or bypass flow may be routed around the high pressure turbine and reintroduced into the exhaust flow downstream of the high pressure turbine and upstream from the low pressure turbine.

In some prior configurations that have routed bypass flow around a high pressure turbine, a bifurcated pipe joint or other branch has been utilized to reintroduce the bypass flow into the exhaust flow upstream of a low pressure turbine. Such joints or branches have also been utilized to extract fluid from and/or inject fluid into other engine systems and conduits such as, for example, exhaust gas regeneration (EGR) systems, compressor bypass systems, etc.

Bifurcated pipe joints or branches typically inject the bypass flow into the main flow, or extract a portion of the main flow, at a single discrete location along the circumference of the main flow conduit. In this manner, however, such joints and branches may also create local flow disturbances within the main flow. Such flow disturbances can lead to undesirable boundary layer separation, pressure losses, and/or non-uniform flow within the main flow. These configurations may also provide less than desirable flow mixing between the bypass or reintroduced flow and the main flow. Additionally, such configurations may also increase the packaging volume required for the turbocharger or other system within the associated engine.

BRIEF DESCRIPTION OF THE INVENTION

In one embodiment, a fluid transfer system for an engine includes a first turbine having an exit for discharging a main fluid flow and a second turbine having an inlet for receiving at least a portion of the main fluid flow. A main conduit fluidically couples the exit of the first turbine to the inlet of the second turbine, with the main conduit carrying the main fluid flow along an axis between the first turbine and the second turbine. A transition conduit is fluidically coupled with the main conduit and located between the exit of the first turbine and the inlet of the second turbine. The transition conduit includes a volute passageway that curves around the main conduit.

The volute passageway includes a slot that follows a route around the curving volute passageway and opens into an interior of the main conduit, with the slot defined at least in part by a lip. The slot establishes a slot entry/exit path (aperture path) for a secondary fluid flow to enter the main conduit upstream of the second turbine. By introducing the secondary fluid flow into the main conduit in this manner, such a configuration enables improved mixing of the secondary flow with the main fluid flow. Such a configuration also decreases the likelihood of undesirable flow disturbances within the main fluid flow. Further, such a configuration conserves valuable engine space by enabling reduced packaging volumes. In other embodiments, the volute passageway and slot may be configured with respect to a main conduit to extract a portion of a main fluid flow from the main conduit.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
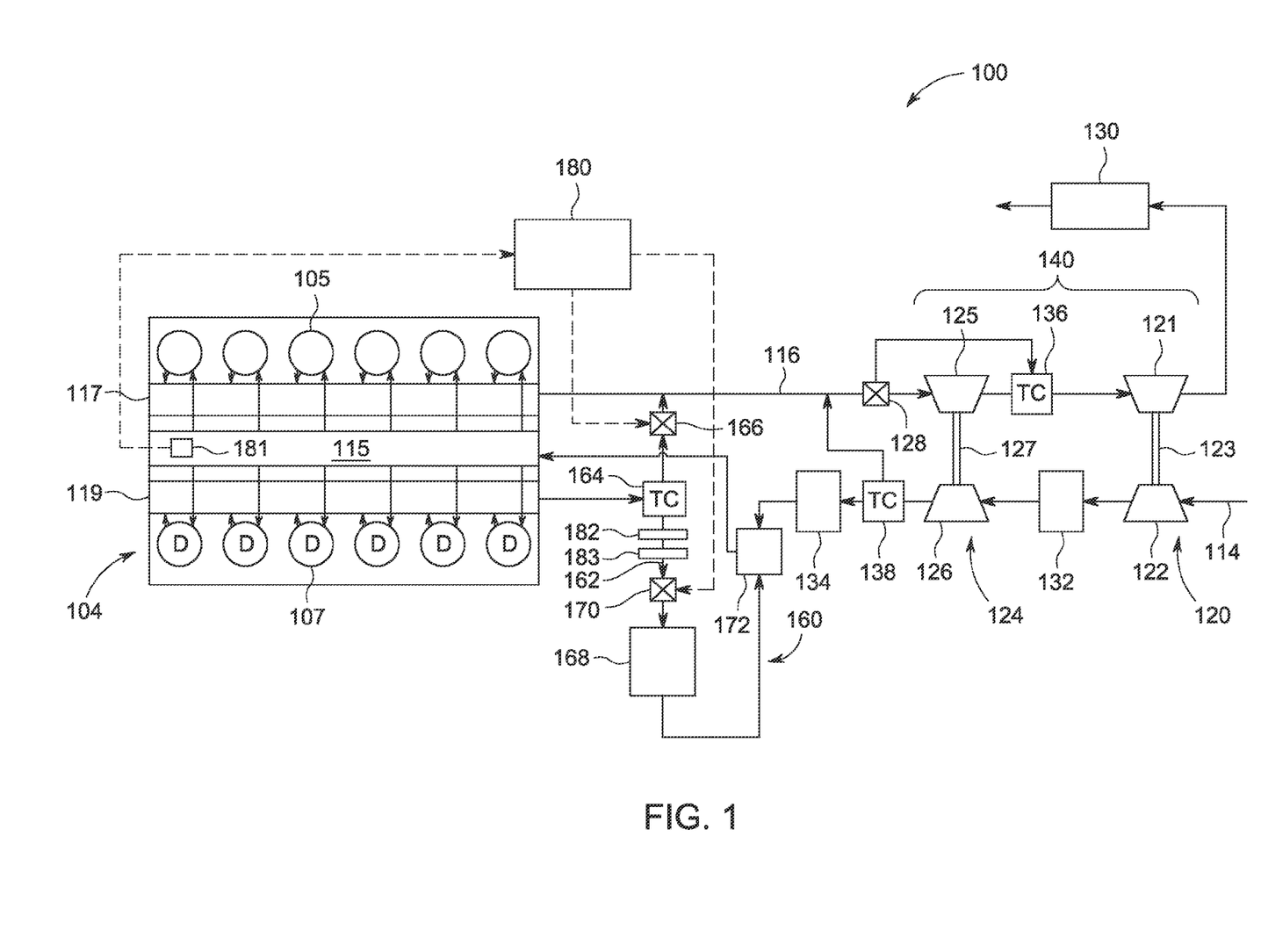
FIG. 1 shows a schematic diagram of an engine system including an engine with two turbochargers in series and a fluid transfer system according to an embodiment of the present disclosure.
Figure 2A:
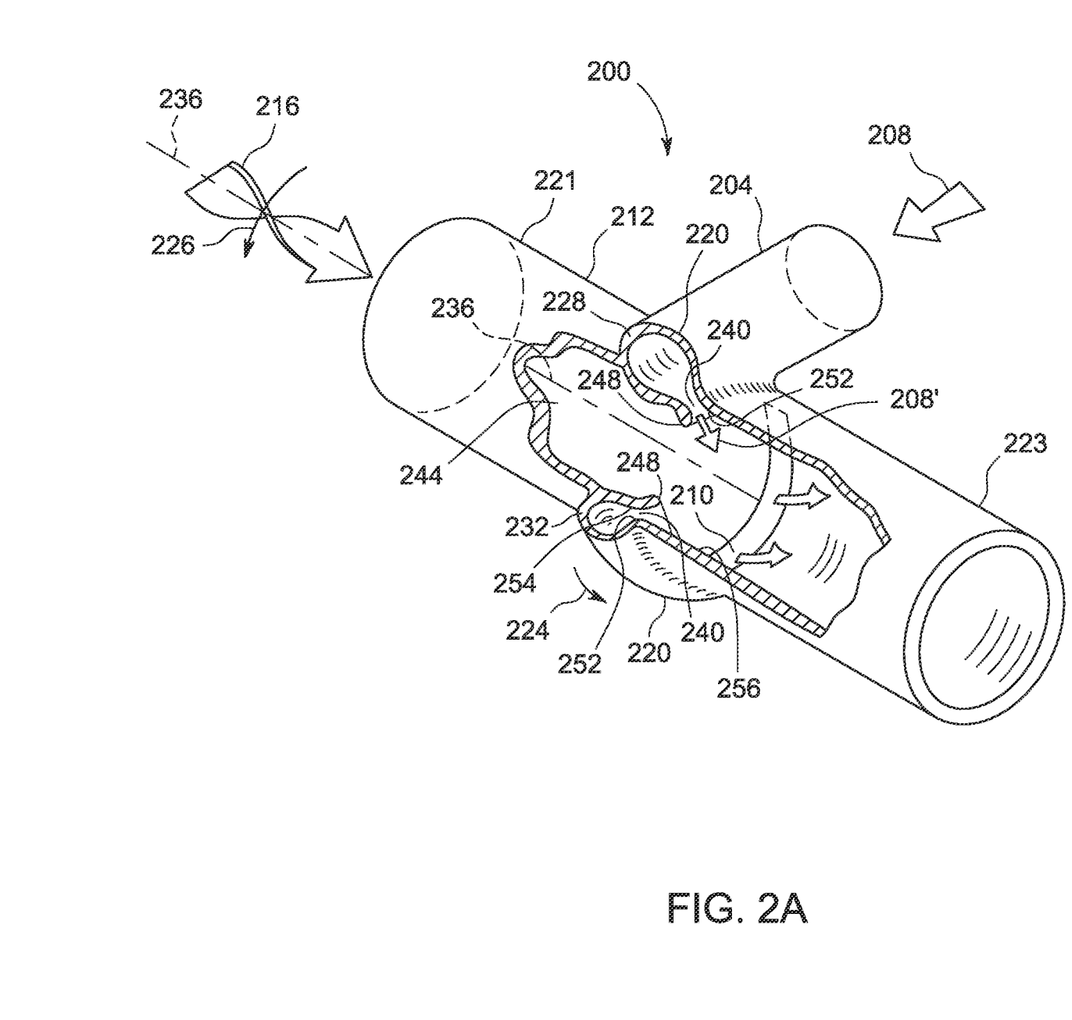
FIG. 2A shows a cut away view of an embodiment of a transition conduit coupled with a main conduit in a configuration for delivering a secondary flow to the main conduit.
Figure 2B:
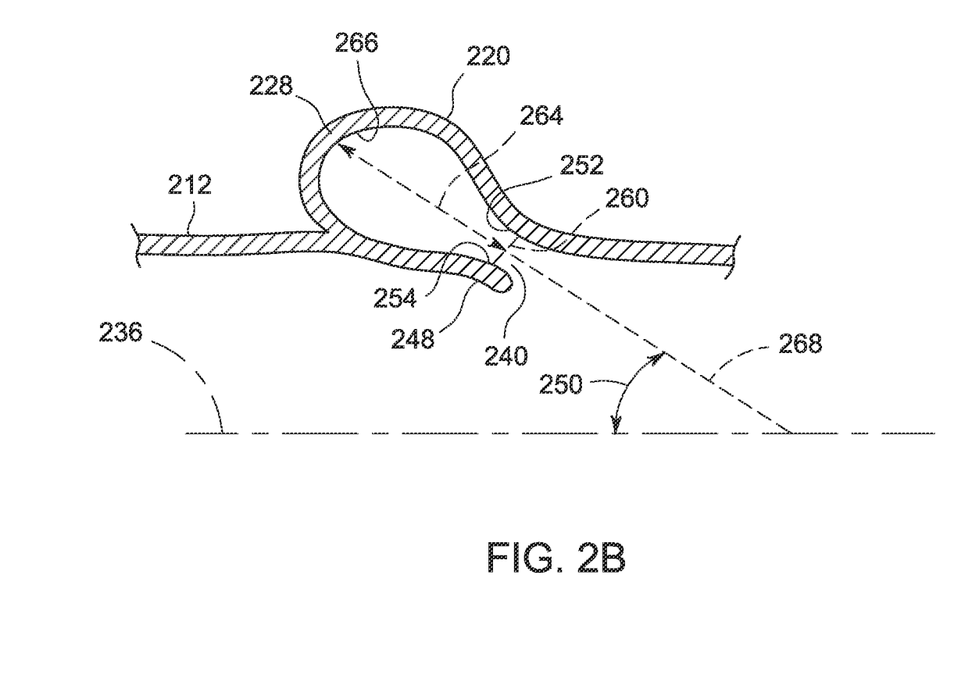
FIG. 2B shows a detailed view of a cutaway location of the transition conduit of FIG. 2A.
Figure 3:
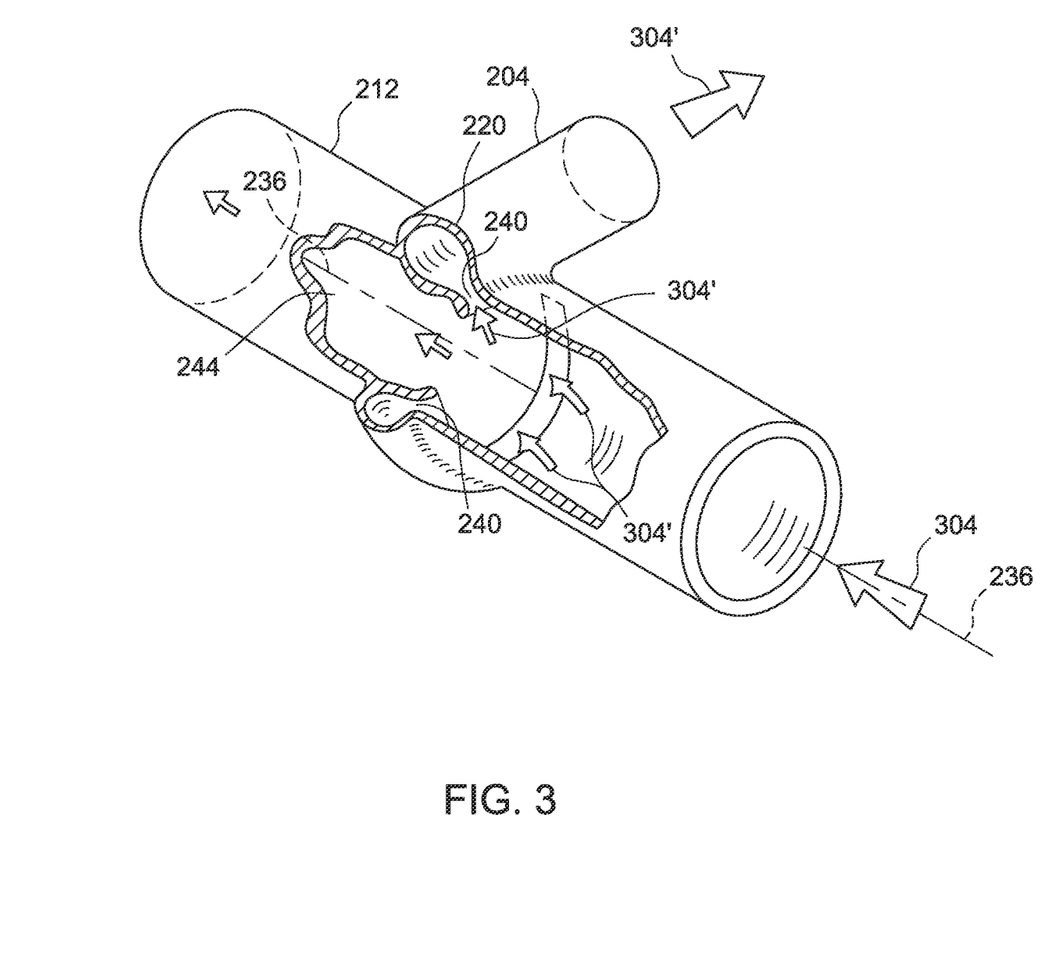
FIG. 3 shows the transition conduit coupled with a main conduit of FIG. 2A in a configuration for extracting fluid flow from the main conduit.
Figure 4:
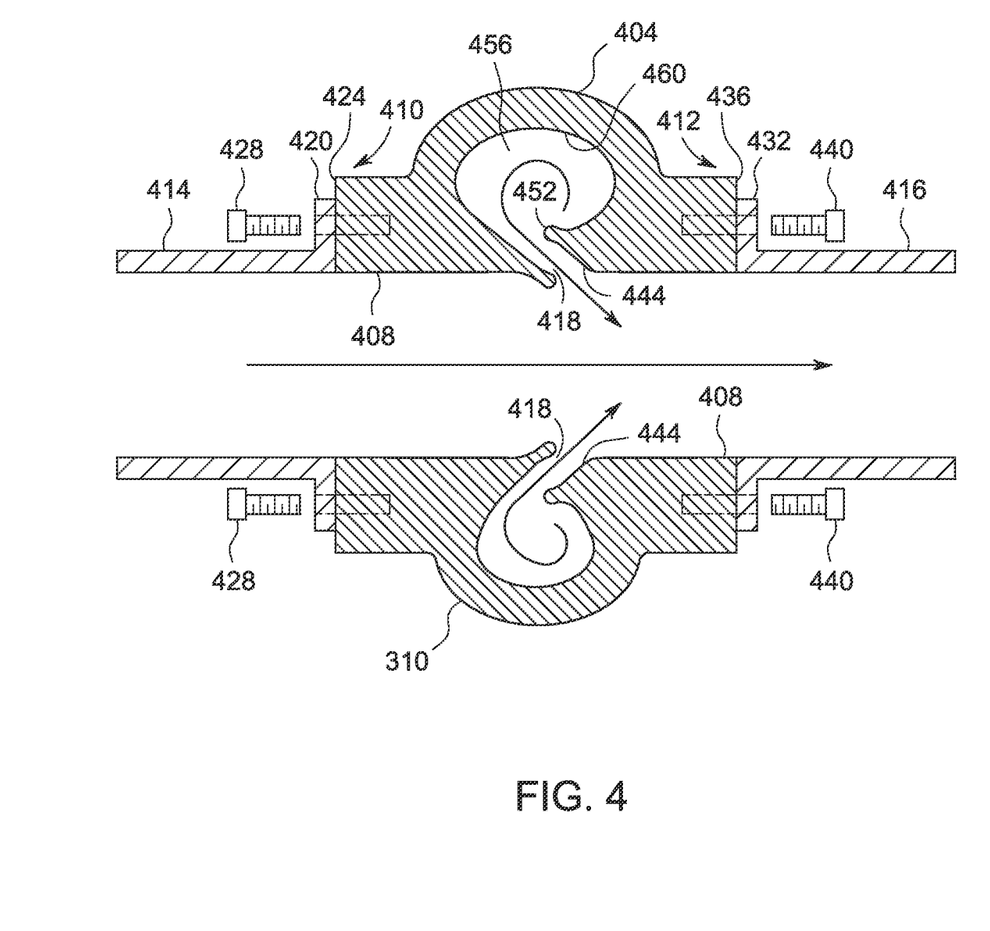
FIG. 4 shows a schematic, sectional view of another embodiment of a transition conduit coupled with a main conduit.
Figure 5:
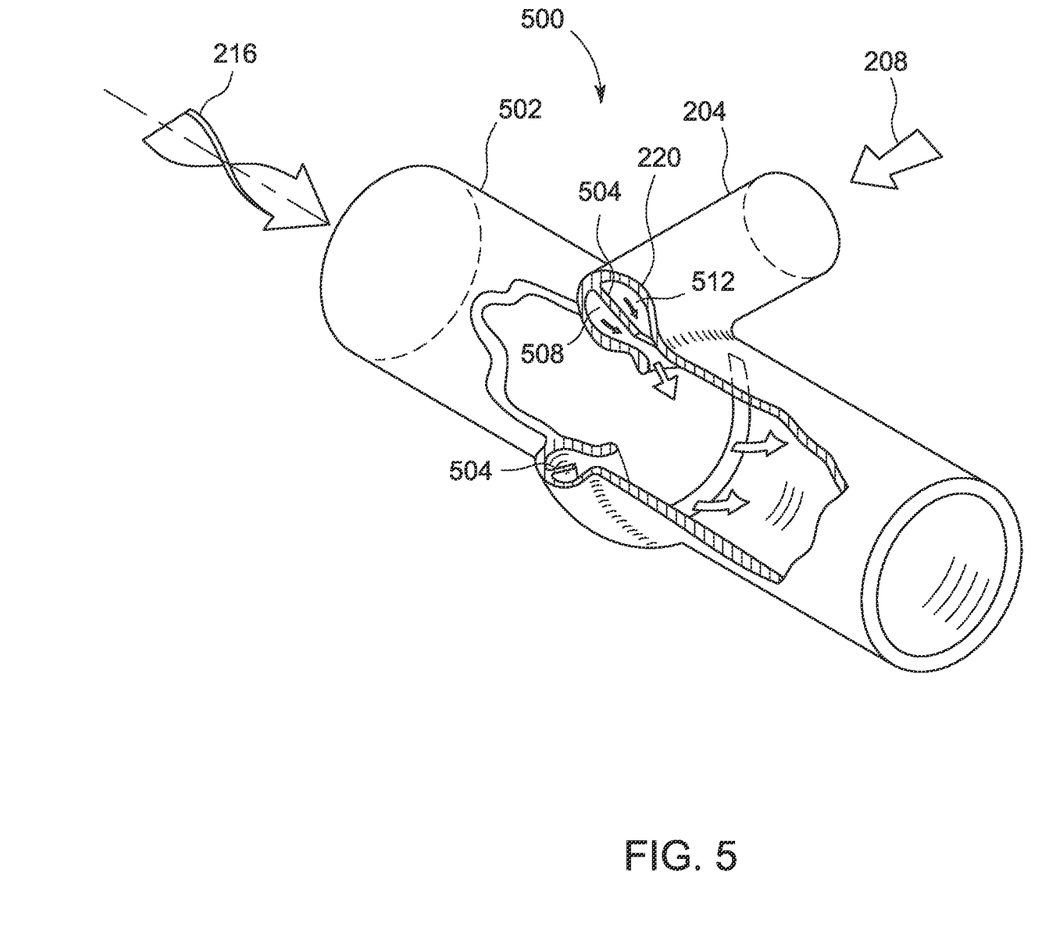
FIG. 5 shows a cut away view of another embodiment of a transition conduit coupled with a main conduit.
Figure 6:
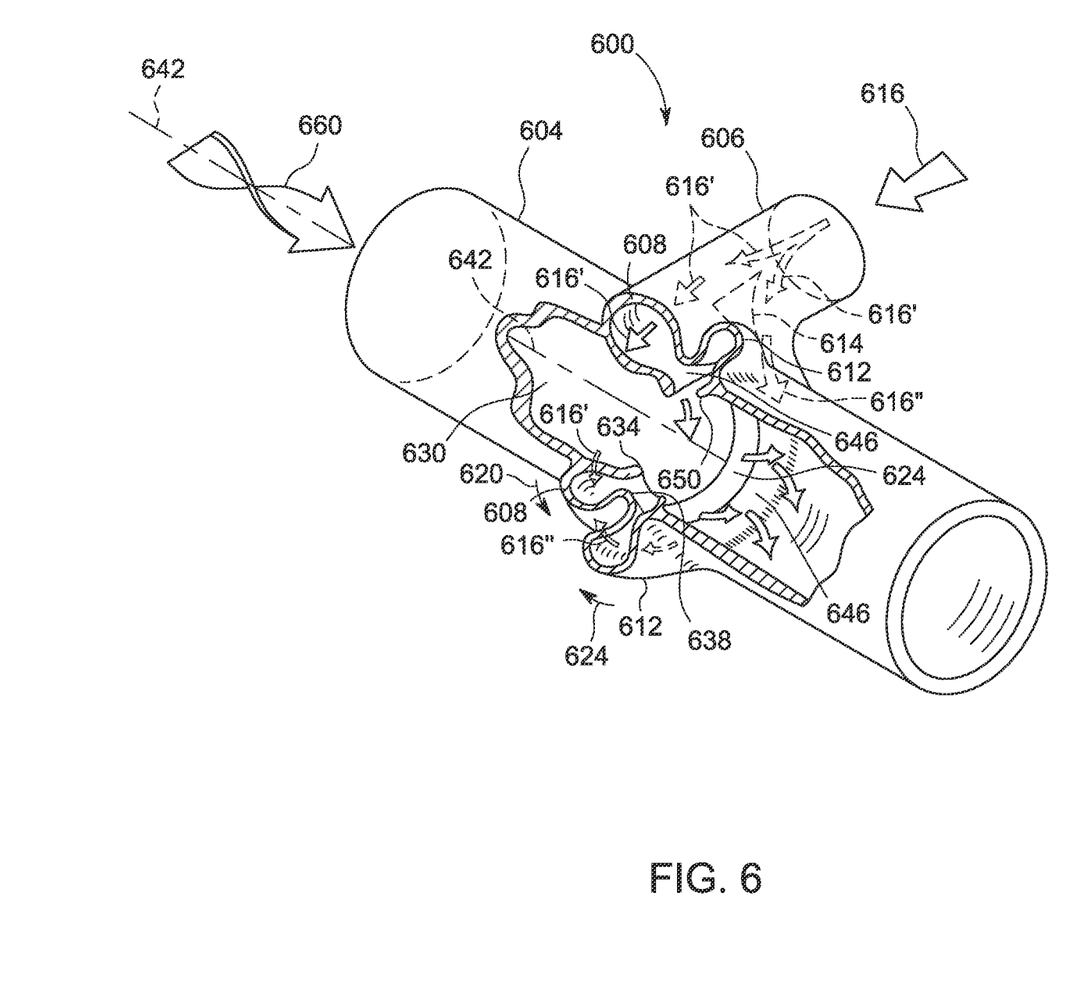
FIG. 6 shows a cut away view of another embodiment of a transition conduit coupled with a main conduit.

The following description relates to various embodiments of a system for transferring fluid flow within an engine and related apparatuses and articles of manufacture. In some embodiments, the system is configured for an engine in a vehicle, such as a rail vehicle. In other embodiments other vehicles may be used. FIG. 1 shows a schematic diagram of an example engine system in which the fluid transfer system of the present disclosure may be utilized. FIG. 2A shows a cut away view of an embodiment of a transition conduit coupled with a main conduit and including a volute passageway with a slot that may be used in the engine of FIG. 1. In this configuration the transition conduit may be used to deliver a secondary flow to the main conduit. FIG. 2B shows a detailed view of a cutaway location of the transition conduit of FIG. 2A. FIG. 3 shows the transition conduit coupled with a main conduit of FIG. 2A in a configuration that may be used to extract fluid flow from the main conduit. FIG. 4 shows a schematic, sectional view of another embodiment of a transition conduit coupled with a main conduit that are removably coupled to a supply conduit and a delivery conduit. FIG. 5 shows a cut away view of another embodiment of a transition conduit coupled with a main conduit and including a volute passageway with a slot that includes an internal divider. In another embodiment, FIG. 6 shows a cut away view of a transition conduit coupled with a main conduit and having two volute passageways.

FIG. 1 shows a block diagram of an exemplary embodiment of an engine system 100 with an engine 104, such as an internal combustion engine. In some examples the engine system 100 may be included in a vehicle system, such as a locomotive. In other examples, the engine 104 may be a stationary engine, such as in a power-plant application (stationary generator set), or an engine in a ship (marine vessel) propulsion system.

The engine 104 receives intake air for combustion from an intake, such as an intake manifold 115. The intake may be any suitable conduit or conduits through which gases flow to enter the engine. For example, the intake may include the intake manifold 115, an intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood that the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust passage 116 to route exhaust gas from the engine 104 to atmosphere (after it passes through an exhaust gas treatment system 130 and first and second turbochargers 120 and 124). The donor cylinders 107, which provide engine exhaust gas recirculation (EGR), are coupled exclusively to an EGR passage 162 of an EGR system 160 which routes exhaust gas from the donor cylinders 107 to the intake passage 114 of the engine 104, and not to atmosphere. In one example, the donor cylinders may be coupled to the EGR passage 162 via a transition conduit 164, as described in more detail below. By introducing cooled exhaust gas to the engine 104, the amount of available oxygen for combustion is decreased, thereby reducing combustion flame temperatures and reducing the formation of nitrogen oxides (e.g., $NO_x$).

In the embodiment shown in FIG. 1, when a second valve 170 is open, exhaust gas flowing from the donor cylinders 107 to the intake passage 114 passes through a heat exchanger such as an EGR cooler 168 to reduce a temperature of (e.g., cool) the exhaust gas before the exhaust gas returns to the intake passage. The EGR cooler 168 may be an air-to-liquid heat exchanger, for example. In such an example, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature.

In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Further, the EGR system 160 includes a first valve 166 disposed between the exhaust passage 116 and the EGR passage 162. The second valve 170 may be an on/off valve controlled by the control unit 180 (for turning the flow of EGR on or off), or it may control a variable amount of EGR, for example. In some examples, the first valve 166 may be actuated such that an EGR amount is reduced (e.g., exhaust gas flows from the EGR passage 162 to the exhaust passage 116). In other examples, the first valve 166 may be actuated such that the EGR amount is increased (e.g., exhaust gas flows from the exhaust passage 116 to the EGR passage 162). In some embodiments, the EGR system 160 may include a plurality of EGR valves or other flow control elements to control the amount of EGR.

In such a configuration, the first valve 166 is operable to route exhaust from the donor cylinders 107 to the exhaust passage 116 of the engine 104, and the second valve 170 is operable to route exhaust from the donor cylinders to the intake passage 114 of the engine 104. In the embodiment shown in FIG. 1, the first valve 166 and the second valve 170 may be engine oil, or hydraulically, actuated valves, for example, with a shuttle valve (not shown) to modulate the engine oil. In some examples, the valves may be actuated such that one of the first and second valves 166 and 170 is normally open and the other is normally closed. In other examples, the first and second valves 166 and 170 may be pneumatic valves, electric valves, or another suitable valve.

As shown in FIG. 1, the engine system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the engine system 100 may additionally or alternatively include a low-pressure EGR system which routes exhaust gas from downstream of the turbochargers 120 and 124 in the exhaust passage 116 to a location upstream of the turbochargers 120 and 124 in the intake passage 114.

As depicted in FIG. 1, the engine system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The second turbocharger 124 operates at a relatively higher pressure, and includes a second turbine 125 which drives a second compressor 126. The second turbine and the second compressor are mechanically coupled via a second shaft 127.

In the embodiment shown in FIG. 1, the second turbocharger 124 is provided with a bypass 128 which allows exhaust gas to bypass the second turbocharger 124. The bypass 128 may be opened, for example, to divert the exhaust gas flow away from the second turbine 125. In this manner, the rotating speed of the compressor 126, and thus the boost provided by the turbochargers 120, 124 to the engine 104, may be regulated during steady state conditions. As described in more detail below, a transition conduit 136 may receive exhaust gas diverted by the bypass 128 and may transfer the exhaust gas to the exhaust passage 116 upstream of the first turbine 121. In other embodiments, each of the turbochargers 120 and 124 may be provided with a bypass, or only the first turbocharger 120 may be provided with a bypass.

The exhaust exiting the second turbine 125 may have a rotational flow component that corresponds to the direction of rotation of the turbine blades in the second turbine. In some examples, the second turbine may include a volute-shaped exit that delivers the exhaust to the exhaust passage 116. It will be appreciated that such a volute-shaped section may also induce a rotational flow component in the exhaust. As described in more detail below, the transition conduit 136 downstream of the second turbine 125 may introduce the diverted exhaust gas from bypass 128 to the exhaust passage 116 via a volute passageway that promotes mixing of the secondary, diverted exhaust flow with the main exhaust flow from the second turbine. The first turbine 121 may likewise include a volute-shaped inlet that receives the combined exhaust flow from the second turbine 125 and transition conduit 136. Thus, in one configuration the volute passageway of the transition conduit 136 may be located between a volute-shaped discharge section of the second turbine 125 and a volute-shaped intake section of the first turbine 121.

In the embodiment shown in FIG. 1, a fluid transfer system 140 may include high pressure turbine 125 and its exit for discharging the exhaust, low pressure turbine 121 and its inlet for receiving at least a portion of the exhaust, and the transition conduit 136 coupled with the exhaust passage 116. Also in this embodiment, a transition conduit 138 may be provided downstream of the second compressor 126. In some examples, the transition conduit 138 may have the same or similar configuration as the transition conduit 136. The transition conduit 138 may extract from the intake passage 114 a portion of the compressed charge air downstream from the second compressor 126. Such extracted portion may then be delivered to the exhaust passage 116 upstream of the bypass 128.

The engine system 100 further includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The engine system 100 further includes the control unit 180, which is provided and configured to control various components related to the engine system 100. In one example, the control unit 180 includes a computer control system. The control unit 180 further includes non-transitory, computer readable storage media (not shown) including code for enabling on-board monitoring and control of engine operation. The control unit 180, while overseeing control and management of the engine system 100, may be configured to receive signals from a variety of engine sensors, as further elaborated herein, in order to determine operating parameters and operating conditions, and correspondingly adjust various engine actuators to control operation of the engine system 100. For example, the control unit 180 may receive signals from various engine sensors including, but not limited to, engine speed, engine load, boost pressure, ambient pressure, exhaust temperature, exhaust pressure, etc. Correspondingly, the control unit 180 may control the engine system 100 by sending commands to various components such as traction motors, alternators, cylinder valves, throttles, heat exchangers, wastegates, bypasses or other valves or flow control elements, etc.

As another example, the control unit 180 may receive signals from various temperature sensors and pressure sensors disposed in various locations throughout the engine system. For example, the control unit may receive signals from a temperature sensor 182 positioned upstream of the EGR cooler 168, a pressure sensor 183 positioned upstream of the EGR cooler in the EGR system 160, and a manifold air temperature (MAT) sensor 181 positioned in the intake manifold 115.

With reference now to FIG. 2A, one embodiment of a transition conduit 200 of the present disclosure will now be described. For ease of description, the transition conduit 200 and other embodiments discussed below may be described with reference to one or more components of the engine system 100 of FIG. 1. It will be appreciated that the transition conduit may be utilized with other engine systems having different components and configurations.

The transition conduit 200 includes an entry/exit passage 204 that receives a secondary fluid flow, indicated by action arrow 208, such as diverted exhaust gas from bypass 128. As shown in FIG. 2A, the entry/exit passage 204 may form substantially a right angle with a main conduit 212, such as the exhaust passage 116. In this manner, the secondary fluid flow may approach the main fluid flow in the main conduit 212, indicated by action arrow 216, at substantially a right angle. ("Substantially a right angle" means at 90 degrees or at 90 degrees but for slight variances due to manufacturing tolerances.) It will be appreciated that in other examples the entry/exit passage 204 and secondary fluid flow 208 may form angles other than a right angle with a main conduit 212 such as, for example, angles ranging between 0 degrees and 180 degrees. (As used herein, the term "entry/exit" refers to allowing for either fluid entry or fluid exit, depending on relative pressure levels and/or flow directions. This does not preclude the situation where a fluid always flows in a single direction (entry or exit) in a given apparatus due to how relative pressures are regularly established in the apparatus. "Opening" and "aperture" may be used herein to describe the same concept.)

The entry/exit passage 204 may be coupled with the main conduit 212 via a volute passageway 220. The volute passageway 220 curves around the main conduit 212 and is located between a first location 221 and a second location 223 of the main conduit. As shown in the cut-away view of FIG. 2A, the cross section of the volute passageway 220 may have a generally oval shape to promote transfer and delivery of the secondary flow to the main conduit 212, as described in more detail below. In other examples the cross section of the volute passageway 220 may have other configurations such as, for example, substantially circular, substantially oblong, etc. The transition conduit 200 may be integrally formed with the main conduit 212. In one example, the transition conduit 200 and main conduit 212 may take the form of a casting.

In one embodiment, the volute passageway 220 has a direction of curvature 224 that is configured to correspond to a rotation direction 226 of the main fluid flow 216. As mentioned above, the exhaust flow exiting the second, high pressure turbine 125 may have a rotational component imparted by the rotation of the turbine blades of the second turbine 125 and/or by a volute-shaped exit that delivers the exhaust to the exhaust passage 116. Thus in one example, the direction of curvature 224 of the volute passageway 220 corresponds to the direction of rotation of the turbine blades of the second turbine 125. In another example, the direction of curvature 224 of the volute passageway 220 corresponds to a direction of curvature of a volute-shaped exit of the second turbine 125. Advantageously, and as explained in more detail below, by matching the direction of curvature 224 with the rotation direction 226 of the main fluid flow 216, the transition conduit 200 minimizes flow losses and enhances flow attachment as the secondary flow 208' exits the volute passageway 220 and mixes with the main fluid flow. It will be appreciated that in other embodiments, the direction of curvature of the volute passageway 220 may be opposite to the direction of rotation 226 of the main fluid flow 216.

In the embodiment shown in FIG. 2A, the volute passageway 220 wraps around the entire circumference of the main conduit 212. In other embodiments, the volute passageway 220 may wrap around less than the entire circumference of the main conduit 212 such as, for example, 25%, 50%, 75%, or other percentage of the entire circumference.

Also as shown in FIG. 2A, the cross sectional area of the volute passageway 220 decreases in a direction of curvature 224 of the volute passageway. The cross sectional area of the volute passageway 220 may be defined as an area of the interior of the volute passageway taken in a plane transverse to the direction of travel of the secondary fluid flow 208, at a location around the circumference of the volute passageway such as, for example, cutaway location 228. In the example depicted in FIG. 2A, the cross sectional area of the volute passageway 220 at cutaway location 228 is greater than the cross sectional area at cutaway location 232. In one embodiment, as viewed from a position looking toward main fluid flow 216 along the longitudinal axis 236 of the main conduit 212, the cross sectional area of the transition conduit 200 decreases beginning from approximately a twelve o'clock position and continues decreasing linearly around the entire length of the curving volute passageway 220. In this manner, the volute passageway 220 may be sized to deliver a homogenous distribution of the secondary fluid flow 208 into the main conduit 212 by controlling the cross sectional area distribution along the circumference of the volute passageway. Additionally, in this manner the volute passageway 220 may be characterized as a funnel.

In one embodiment, the cross sectional area of the transition conduit 200 may linearly decrease from a maximum of approximately 323 cm$^2$ (approximately 4 inch/10.16 cm radius) at the twelve o'clock position to a minimum of approximately 0 cm$^2$ at a position 360 degrees from the twelve o'clock position (where the transition conduit 200 ends). In another embodiment, the transition conduit 200 may end and the cross sectional area of the transition conduit may reach 0 cm$^2$ at a position slightly less than 360 degrees from the twelve o'clock position. In another embodiment, the transition conduit 200 may end with a minimum cross sectional area of the transition conduit being less than 323 cm$^2$ and greater than 0 cm$^2$, e.g., from about 3 to about 13 cm$^2$ (about 1 to 2 cm radius); for example, such a configuration may be used to facilitate manufacturing in situations where is it not possible to economically produce a conduit that terminates at a "fine point." It will also be appreciated that the transition conduit 200 may receive exhaust gas that is diverted around a turbine by a bypass. In some examples, the diverted exhaust gas may comprise from about 0% to about 40% of a total engine mass flow through an exhaust passage. Such total engine mass flow may comprise, for example, from about 0.5 kg/sec to about 8.2 kg/sec.

Thus, in an embodiment, the cross sectional area of the transition conduit 200 linearly decreases from a maximum of approximately 323 cm$^2$ at the twelve o'clock position to a minimum of less than 323 cm$^2$ (e.g., from about 0 to about 13 cm$^2$) at a position a given number of degrees from the twelve o'clock position (where the transition conduit 200 ends), where the given number of degrees is 360 degrees or less than 360 degrees, such as from about 315 degrees to about 360 degrees. Exhaust gas diverted through the transition conduit is from about 0% to about 40% of a total engine mass flow through an exhaust passage, where the total engine mass flow is from about 0.5 kg/sec to about 8.2 kg/sec. As should be appreciated, the particular maximum cross sectional area, etc. will depend on the specific engine system size and configuration; thus, while the examples of the cross sectional area given in this section may be applicable for certain implementations where from about 0% to about 40% of a total engine mass flow of from about 0.5 kg/sec to about 8.2 kg/sec is diverted, they are not necessarily applicable to all possible implementations. As the cross sectional area of the transition conduit 200 decreases, the exhaust flow is forced to exit the volute passageway 220 through a slot 240. The slot 240 follows a route around the curving volute passageway 220 to provide an entry/exit path (aperture path) for the secondary fluid 208 to enter the interior 244 of the main conduit 212. In the embodiment illustrated in FIG. 2A, the slot 240 follows a helical route around the curving volute passageway 220. In other embodiments the slot 240 may follow a circular route around the curving volute passageway 220.

With reference also to FIG. 2B, the slot 240 is defined at least in part by a lip 248 that protrudes into the interior 244 of the main conduit 212. As shown in FIGS. 2A and 2B, the lip 248 ends at a location radially spaced from the longitudinal axis 236 of the main conduit 212. Spaced laterally from the lip 248 is a neck 252 that curves around the volute passageway 220 along a path that is substantially parallel to the lip 248 to form the slot 240. Advantageously, in one embodiment the slot 240 is configured to induce a venturi effect in the secondary flow 208' as the flow exits the slot 240. A venturi effect may be defined as the increase in velocity and decrease in static pressure of a fluid as it flows through a decreasing cross sectional area. In this manner, the slot 240 increases the velocity of the secondary flow 208' and decreases the pressure of the flow as it exits the slot.

With further reference to FIG. 2B, in one embodiment a cross sectional area of the slot 240 may be defined by a lateral width of the slot at the narrowest distance between the neck 252 and an interior wall 254 of the protruding lip 248, such width indicated by dotted line 260, and the annular circumference of the slot 240. In this embodiment, the cross sectional area of the slot 240 may be expressed as the product of such lateral width and annular circumference of the slot. Accordingly, the cross sectional area of the slot 240 may be visualized as an elongated rectangle having a width equal to such lateral width and a length equal to such annular circumference, with the elongated rectangle wrapped in an annular fashion to form a circular conical surface. The conical surface tapers inwardly toward the longitudinal axis 236 of the main conduit 212, with the plane of the conical surface being angled with respect to the longitudinal axis.

The width 260 of the slot 240 is also less than a depth 264 of the volute passageway 220, where the depth 264 is measured from the width 260 to the furthest point from the width along an interior wall 266 of the volute passageway. In the depicted embodiment, the width 260 of the slot 240 is approximately 20% of the depth 264 of the volute passageway 220. Additionally, a slot exit path 268 may be defined by a line that is perpendicular to the width 260 and extends from the slot to the longitudinal axis 236 of the main conduit 212. As shown in FIG. 2B, in one embodiment the slot exit path 268 forms an acute angle 250 with respect to the longitudinal axis 236, with the acute angle 250 opening toward the direction of travel of the main fluid flow 216. In one embodiment, the acute angle 250 may be maintained constant around the entire circumference of the slot 240. In one embodiment the acute angle 250 may be 45 degrees. In other embodiments, the acute angle 250 may range between 1 and 89 degrees.

By utilizing a lip 248 and corresponding slot 240 that form an acute angle 250 with respect to the longitudinal axis 236 of the main conduit 212, the slot 240 is configured to distribute at least a portion of the secondary flow 208' around an inner circumference 256 of the main conduit 212. Further, the volute passageway 220 is configured to impart a tangential momentum component to the secondary fluid flow 208' as it exits the slot, with such component being tangential to the direction of rotation 224. Advantageously, such a tangential momentum component enables the secondary fluid flow 208' to better merge and mix with the main fluid flow 216, and particularly when the main fluid flow has a rotational flow component 226 corresponding to the direction of rotation 224 of the volute passageway 220. It will also be appreciated that the volute passageway 220 and slot 240 are configured to impart a radial momentum component to the secondary fluid flow 208' in a direction toward the longitudinal axis 236 of the main conduit 212 as the flow exits the slot. It will be appreciated that the vector sum of the tangential and radial momentum components of the secondary fluid flow 208' exiting the slot 240 combine to represent the actual motion of the secondary fluid flow as it enters the main conduit 212.

Additionally, the cross sectional area of the slot 240 is sized to match a first speed of the secondary fluid flow 208' to a second speed of the main fluid flow 216 through the interior 244 of the main conduit 212. Advantageously, by sizing the cross sectional area of the slot 240 in this manner, a consistent mixing of the two flows with minimized flow losses may be achieved. Further, by sizing the cross sectional area of the slot 240 in this manner, a mixture comprising a desired amount of secondary fluid per unit volume of main fluid may also be realized.

The cross sectional area of the volute passageway 220 may also be matched to the geometry and cross sectional area of the slot 240 to provide uniform pressure and flow of the secondary fluid flow 208 around the volute passageway. Such uniform pressure and flow may promote consistent exit velocity of the secondary flow 208' from the slot 240 to further enhance mixing of the secondary flow 208' with the main fluid flow 216.

FIG. 3 shows the transition conduit 200 coupled with the main conduit 212 in a configuration for extracting a portion of fluid flow from the main conduit. In this configuration, the slot 240 opens into the interior 244 of the main conduit 212 to establish a path for a portion of the main fluid flow 304 to exit the main conduit.

In this configuration, the main fluid flow 304 may travel within the main conduit 212 along the longitudinal axis 236 in a direction opposite to the direction of the main fluid flow 216 in FIG. 2A. In this configuration, the slot 240 establishes a path for a portion of the main fluid flow, indicated generally by arrow 304', to exit the main conduit 212 and enter the volute passageway 220. The volute passageway 220 then directs the portion 304' of the main fluid flow through the entry/exit passage 204. With reference to FIG. 1, in one example this configuration of transition conduit 220 coupled with main conduit 212 may correspond to transition conduit 164 that receives exhaust from donor cylinders 107 and may direct a portion of the exhaust to first valve 166 disposed between the exhaust passage 116 and the EGR passage 162.

In this configuration, the geometry and orientation of the slot 240 as described above promote suction of a portion of the main fluid flow 304 into the volute passageway 220. Further, and with reference also to FIG. 2B, in this configuration the acute angle 250 formed by the slot exit path 268 opens away from the direction of travel of the main fluid flow 304. Additionally, the acute angle 250 and geometry and area ratios of the volute passageway 220 and slot 240 may be varied to achieve a desired fraction of the main fluid flow 304 that is extracted from the main conduit 212. Thus, an advantage that may be realized in the practice of some embodiments of the described systems and apparatuses is that a single embodiment of the transition conduit 200 coupled with main conduit 212 may be utilized in one configuration to deliver a secondary fluid flow to a main fluid flow, and in another configuration to extract a portion of a main fluid flow from a main conduit.

FIG. 4 shows a schematic, sectional view of another embodiment of a transition conduit 404 coupled with a main conduit 408. In this embodiment, transition conduit 404 and main conduit 408 are integrally formed and include a supply side 410 and a delivery side 412. The transition conduit 404 and main conduit 408 are removably coupled to a supply conduit 414 and a delivery conduit 416. As shown in FIG. 4, a supply side flange 420 of the supply conduit 414 is removably coupled to a supply side face 424 of the transition conduit 404 by bolts 428. While two bolts 428 are shown, it will be appreciated that any other suitable types and/or numbers of fasteners may be utilized to removably couple the supply side flange 420 to the supply side face 424. Similarly, a delivery side flange 432 of the delivery conduit 416 is removably coupled to a delivery side face 436 of the transition conduit 404 by bolts 440. Advantageously, in this embodiment the transition conduit 404 coupled with a main conduit 408 may be easily retrofitted, substituted, and/or removed for maintenance or reconfiguration from existing conduits carrying a main fluid flow.

Also shown in FIG. 4, the neck 444 of the slot 448 may include a lip 452 that projects into the collection area 456 of the volute passageway 460. In this configuration, the lip 452 may cooperate with the geometry and cross sectional area of the volute passageway 460 to provide uniform pressure and flow around the volute passageway.

Turning now to FIG. 5, another embodiment of a transition conduit 500 coupled with a main conduit 502 will now be described. As shown in FIG. 5, in this embodiment the volute passageway 220 includes a divider 504 that creates a first flow chamber 508 and a second flow chamber 512 around the volute passageway. In this manner, the divider 504 creates two flow paths around the volute passageway 220 that transfer the secondary fluid flow 208 in parallel directions. Advantageously, where the secondary fluid flow 208 entering the entry/exit passage 204 is turbulent and/or has a rotational or swirl component, the divider 504 may reduce the turbulence and/or rotation or swirl of the secondary fluid flow as the flow travels around the volute passageway 220.

It will also be appreciated that in other configurations, the embodiment shown in FIG. 5 may be used to extract a main fluid flow traveling in a direction opposite to the main fluid flow 216 shown in FIG. 5. In these configurations, the divider 504 creates two flow paths around the volute passageway that transfer the flow extracted from the main conduit 212 in parallel directions.

Turning now to FIG. 6, another embodiment of a transition conduit 600 coupled with a main conduit 604 will now be described. In this embodiment, an entry/exit passage 606 may be coupled with the main conduit 604 via a first volute passageway 608 and a second volute passageway 612 adjacent to the first volute passageway. A diverter 614 splits the incoming secondary fluid flow 616 into a first flow portion 616' that continues traveling around first volute passageway 608 in the direction of action arrow 620, and a second flow portion 616" that is diverted downwardly into and around the second volute passageway 612 in a direction of action arrow 624 that is opposite to direction 620. It will be appreciated that arrow 620 also indicates a direction of curvature of the first volute passageway 608, and arrow 624 also indicates a direction of curvature of the second volute passageway 612.

The first volute passageway 608 includes a first slot 624 that follows a route around the first volute passageway and opens into the interior 630 of the main conduit 604. The first slot 624 is defined at least in part by a first lip 634 that protrudes into the interior 630 of the main conduit 604. The first slot 624 includes a slot exit path that extends at an acute angle with respect to the longitudinal axis 642 of the main conduit 604, with such slot exit path and acute angle defined as described above with respect to FIG. 2B. Spaced laterally from the first lip 634 is a neck 638 that curves around and between the first volute passageway 608 and second volute passageway 612 along a path that is substantially parallel to the first lip 634 to form the first slot 624.

In a similar manner, the second volute passageway 612 includes a second slot 646 that follows a route around the second volute passageway and opens into the interior 630 of the main conduit 604. The second slot 646 includes a second lip 650 that protrudes into the interior 630 of the main conduit 604. The second slot 646 includes a slot exit path that extends at an obtuse angle with respect to the longitudinal axis 642 of the main conduit 604, with such slot exit path defined as described above with respect to FIG. 2B. The neck 638 is spaced laterally from the second lip 650 to form the second slot 646.

As in previously described embodiments, the cross sectional area of the first volute passageway 608 decreases in the direction of curvature 620 of the first volute passageway. Similarly, the cross sectional area of the second volute passageway 612 decreases in the direction of curvature 624 of the second volute passageway. Accordingly, the first flow portion 616' is forced to exit the first volute passageway 608 through the first slot 624, and the second flow portion 616" is forced to exit the second volute passageway 612 through the second slot 646.

Because the first slot 624 and the second slot 646 are oriented at different angles with respect to the longitudinal axis 642 of the main conduit 604, it will be appreciated that the first flow portion 616' exiting the first slot 624 will intersect and mix with the second flow portion 616" exiting the second slot 646. Additionally, as the direction of curvature 620 of the first volute passageway 608 is opposite to the direction of curvature 624 of the second volute passageway 612, the first flow portion 616' and the second flow portion 616" will have opposing tangential momentum components. Thus, an advantage that may be realized in the practice of some embodiments of the described systems and apparatuses is that as the first flow portion 616' and the second flow portion 616" intersect and mix, these opposing tangential momentum components may provide improved mixing with the main fluid flow 660.

Thus, a transition conduit coupled with a main conduit may be provided with an engine system in a vehicle, such as a locomotive or other rail vehicle. Packaging constraints in the engine system may require, for example, close coupling of a first and second turbocharger. A main conduit fluidically couples the exhaust gas flow of a turbine of the first turbocharger to a turbine of the second turbocharger. The engine system may also include a secondary fluid flow that is introduced to the exhaust gas flow in the main conduit between the turbines of the first and second turbochargers. The transition conduit includes a volute passageway that is curved about the main conduit. The volute passageway has a slot that follows a route around the curving volute passageway and opens into an interior of the main conduit. The slot is configured to establish a path for the secondary fluid flow to enter the main conduit. The volute passageway and slot are also configured to deliver the secondary fluid flow to the exhaust gas flow in the main conduit in a manner that minimizes flow losses and provides improved mixing of the two flows. Advantageously, the transition conduit coupled with a main conduit may be embodied in a simpler, more compact configuration. Accordingly, packaging requirements and associated manufacturing costs of the transition conduit and main conduit may be reduced.

In another embodiment of the transition conduit, the volute passageway is the same as described in the section immediately above, but is further adapted for transferring a secondary fluid flow from a first engine component to a second engine component in an internal combustion engine system. For example, the volute passageway may be configured to receive the secondary fluid flow from a bypass upstream of a high pressure turbine of a first turbocharger in an engine system (e.g., the volute passageway may be dimensioned for mating with an output of the bypass), and the main conduit may be configured to carry high pressure exhaust gas discharged by the high pressure turbine of the first turbocharger to a low pressure turbine of a second turbocharger of the engine system (e.g., the main conduit may be dimensioned for mating with an output of the high pressure turbine and an input of the low pressure turbine).

In another embodiment of the transition conduit, the volute passageway is the same as described in either of the two sections immediately above, and further is configured as follows. As the volute passageway extends along a longitudinal center line of the main conduit, the volute passageway curves and wraps back around towards itself. (It may also be the case that as the passageway wraps back around towards itself, the longitudinal center line of the main conduit is not uni-planar; that is, the volute passageway is generally helical.) The slot is elongate and extends along at least part of the curved length of the volute passageway, such that the major plane of the slot is at least arc shaped, e.g., arc shaped or, in an embodiment, if the slot curves back around towards itself, ring shaped.

Another embodiment relates to a fluid transfer system for an engine. A first turbine has an exit for discharging a main fluid flow. A second turbine includes an inlet that is fluidically coupled to the exit of the first turbine by a main conduit. The main conduit is configured to carry the main fluid flow along an axis between the first turbine and the second turbine. In some embodiments the axis may be linear, while in other embodiments the axis may be curvilinear. A funnel is fluidically coupled to the main conduit and located between the exit of the first turbine and the inlet of the second turbine. The funnel is configured to curve around the main conduit, and includes a cross section with an area that decreases in a direction of curvature of the funnel from at least a first position to a second position. The direction of curvature of the funnel is configured to correspond to a rotation direction of the first turbine and the main fluid flow exiting the first turbine. The funnel further includes a slot that opens in to an interior of the main conduit, the slot defined at least in part by a lip. In one embodiment, the slot is annular with respect to a plane perpendicular to the longitudinal axis of the main conduit. In other embodiments, the slot may be helical with respect to a plane perpendicular to the longitudinal axis of the main conduit. The slot establishes a path for a secondary fluid flow to entire the main conduit from the funnel upstream of the second turbine. In operation, the decreasing cross section of the funnel discharges the flow from the slot. The direction of curvature of the funnel imparts a tangential momentum component to the secondary flow that minimizes flow losses and improves mixing of the secondary flow with the main fluid flow.

Another embodiment relates to an article of manufacture. The article includes a first turbine having an exit for discharging a main fluid flow, and a second turbine having an inlet for receiving at least a portion of the main fluid flow. The article further includes a main conduit that fluidically couples the exit of the first turbine to the inlet of the second turbine. The main conduit is configured to carry the main fluid flow along a longitudinal axis between the first turbine and the second turbine. The article further includes a transition conduit coupled with the main conduit. The transition conduit curves around the main conduit and has a slot that opens into an interior of the main conduit. The slot is defined at least in part by a lip, and the slot establishes a path for a secondary fluid flow to enter the main conduit upstream of the second turbine.

Another embodiment relates to an engine system. The engine system comprises a first turbocharger having a first turbine, a second turbocharger having a second turbine, and a main conduit fluidically coupling an exit of the first turbine with an inlet of the second turbine. The main conduit is configured to carry an exhaust flow along a longitudinal axis between the first turbine and the second turbine. The engine system further includes a transition conduit coupled with the main conduit. The transition conduit curves around the main conduit and has a slot that opens into an interior of the main conduit. The slot is defined at least in part by a lip, and the slot establishes a path for a secondary fluid flow to enter the main conduit upstream of the second turbine.

In an embodiment, such as in any of the other embodiments described herein, the slot is the sole egress for fluid flow through the volute passageway, e.g., funnel. In an embodiment, such as in any of the other embodiments described herein, the slot is the sole ingress for a portion of the fluid flow in the volute passageway, e.g., funnel, to exit the volute passageway. In an embodiment, such as in any of the other embodiments described herein, the slot is annular with respect to a plane perpendicular to the longitudinal axis of the main conduit. In an embodiment, such as in any of the other embodiments described herein, the slot is helical with respect to a plane perpendicular to the longitudinal axis of the main conduit. In an embodiment, such as in any of the other embodiments described herein, the slot fully encircles the main conduit; e.g. traverses 360 degrees around the main conduit. In an embodiment, such as in any of the other embodiments described herein, the slot traverses less than 360 degrees around the main conduit such as, for example, between approximately 180 and approximately 359 degrees.

Another embodiment relates to an article of manufacture. The article comprises a main conduit having an interior and a longitudinal axis, for passage of a main fluid flow. For example, the main conduit may comprise a section of cylindrical piping with a cylindrical interior. The article further comprises a secondary conduit, and a volute passageway that wraps around the main conduit. That is, with respect to a circle in a plane transverse to the longitudinal axis of the main conduit, with the longitudinal axis in the center of the circle, the volute passageway extends along at least 180 degrees of the circle. The volute passageway has an interior that is fluidly coupled with an interior of the secondary conduit. The secondary conduit extends away from the main conduit; that is, the secondary conduit is for delivering fluid flow to the main conduit, or away from the main conduit, with the volute passageway acting as the physical interface or transition between the secondary conduit and the main conduit. The volute passageway has a slot that extends along with the curvature of the volute passageway around the main conduit; the slot fluidly couples the volute passageway interior with the interior of the main conduit. The volute passageway further comprises an annular lip (annular with respect to a plane transverse to the longitudinal axis of the main conduit), which extends down into the interior of the main conduit and partially defines the slot. Thus, a transverse cross sectional area of the main conduit (area of the interior of the main conduit taken in a plane transverse to the longitudinal axis of the main conduit) has a first area upstream or downstream of the lip, and a smaller, restricted transverse cross sectional area where the lip impinges into the interior of the main conduit.

Another embodiment relates to an article of manufacture comprising a main conduit (first conduit) for carrying a main fluid flow (first fluid flow). The article of manufacture further comprises passageway means coupled to the main conduit for at least one of introducing a secondary fluid flow to the main conduit and/or removing a portion of the main fluid flow from the main conduit. (Whether a secondary flow is introduced or a portion of the main fluid flow is removed will depend on the direction of the main fluid flow through the main conduit and/or on relative pressures of fluid flows through the main conduit and passageway means; the structure of the passageway means is configured to perform both functions.) Embodiments of suitable structures for the passageway means are shown in FIGS. 2A-6 (e.g., 608, 612; 220).

In another embodiment, an article of manufacture includes a transition conduit, and a main conduit coupled with the transition conduit. The transition conduit comprises an entry/exit passage (aperture passage), and a volute passageway connected to the entry/exit passage that curves around the main conduit. The volute passageway has a slot that follows a route around the curving volute passageway and opens into an interior of the main conduit. The slot is defined at least in part by a lip. The slot establishes a path for either a secondary fluid flow to enter the main conduit or a portion of a main fluid flow to exit the main conduit. Other aspects of this embodiment of the article of manufacture may be as otherwise set forth herein in regards to other embodiments.

In another embodiment, such as in any of the other embodiments described herein, an entry/exit passageway (aperture passageway) of a transition conduit may be located downstream from a turbine that receives engine exhaust gas from an exhaust passage. The entry/exit passageway may introduce exhaust gas that is diverted around the turbine by a bypass to an exhaust passage via a volute passageway. In some examples, the diverted exhaust gas may comprise from about 0% to about 40% of a total engine mass flow through the exhaust passage. Such total engine mass flow may comprise, for example, from about 0.5 kg/sec to about 8.2 kg/sec. In some examples, a radius of the interior of the entry/exit passageway taken at a location upstream from the volute passageway may be about 10 cm or less. It will be appreciated that a configuration of the transition conduit and associated entry/exit passageway, including geometries and relative dimensions such as an entry/exit passageway radius, may be selected in conjunction with a particular engine configuration, for example a combustion engine that is fueled by diesel, gasoline, natural gas, or other suitable fuel. A configuration of the transition conduit and associated entry/exit passageway may also be selected in conjunction with engine operating requirements such as, for example, power output, fuel economy, emissions controls, and/or other relevant factors.

As used herein, "main conduit" and "main fluid flow" refer generally to a first conduit and a first fluid flow. That is, "main" does not necessarily refer to having a particular operational significance or prominence, or that the main conduit necessarily carries a larger flow volume than a secondary passage at all times or any time. However, in embodiments, it may be the case that a main fluid flow carried by a main conduit is larger in magnitude, in at least some modes of operation, then a fluid flow carried by a secondary conduit.

As used in the description above, the terms "high pressure" and "low pressure" are relative, meaning that "high" pressure is a pressure higher than a "low" pressure. Conversely, a "low" pressure is a pressure lower than a "high" pressure.

In this written description, references to "one embodiment" or "an embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A transition conduit coupled with a main conduit, comprising:
    a volute passageway curving around the main conduit;
    the volute passageway having a slot that follows a route around the curving volute passageway and opens into an interior of the main conduit, the slot defined at least in part by a lip, the slot establishing a slot entry/exit path for either a secondary fluid flow to enter the main conduit or a portion of a main fluid flow to exit the main conduit, wherein the volute passageway is a first volute passageway that transfers either the secondary fluid flow or the portion of the main fluid flow in a first direction, and the slot entry/exit path is a first slot entry/exit path, further comprising a second volute passageway located adjacent to the first volute passageway, the second volute passageway curving around the main conduit and transferring either the secondary fluid flow or the portion of the main fluid flow in a second direction opposite to the first direction;
    the second volute passageway having a second slot that follows a second route around the curving second volute passageway and opens into the interior of the main conduit, the second slot defined at least in part by a second lip, the second slot establishing a second slot entry/exit path for either the secondary fluid flow to enter the main conduit or a second portion of the main fluid flow to exit the main conduit.

2. The transition conduit coupled with the main conduit of claim 1, wherein the volute passageway is configured to impart a tangential momentum component to the secondary fluid flow as the secondary fluid flow exits the slot and enters the main conduit.

3. The transition conduit coupled with the main conduit of claim 1, wherein the slot entry/exit path extends at an acute angle with respect to a longitudinal axis of the main conduit.

4. The transition conduit coupled with the main conduit of claim 1, wherein the slot is configured to induce a venturi effect in the secondary fluid flow.

5. The transition conduit coupled with the main conduit of claim 4, wherein a cross-sectional area of the slot is sized to match a first speed of the secondary fluid flow to a second speed of the main fluid flow.

6. The transition conduit coupled with the main conduit of claim 1, wherein the volute passageway has a cross sectional area that decreases in a direction of curvature of the volute passageway around the main conduit from at least a first position to a second position.

7. The transition conduit coupled with the main conduit of claim 6, wherein the direction of curvature of the volute passageway is configured to correspond to a rotation direction of the main fluid flow.

8. The transition conduit coupled with the main conduit of claim 1, wherein the volute passageway is located downstream from a first portion of the main fluid flow in the main conduit and upstream from the second portion of the main fluid flow in the main conduit.

9. The transition conduit coupled with the main conduit of claim 1, wherein the volute passageway includes a divider between the volute passageway and the second volute passageway.

10. The transition conduit coupled with the main conduit of claim 1, wherein the transition conduit and the main conduit are integrally formed and are removably coupled to a supply conduit on a supply side and a delivery conduit on a delivery side.

11. The transition conduit coupled with the main conduit of claim 1, wherein the transition conduit is integrally formed with the main conduit.

12. A fluid transfer system for an engine, comprising:
    a first turbine having an exit for discharging a main fluid flow;
    a second turbine having an inlet for receiving at least a portion of the main fluid flow;
    a main conduit fluidically coupling the exit of the first turbine to the inlet of the second turbine, the main conduit configured to carry the main fluid flow along an axis between the first turbine and the second turbine; and a funnel fluidically coupled to the main conduit and located between the exit of the first turbine and the inlet of the second turbine, the funnel curving around the main conduit;

the funnel having a slot that opens into an interior of the main conduit, the slot defined at least in part by a lip, the slot establishing a path for a secondary fluid flow to enter the main conduit upstream of the second turbine, wherein the funnel is a first funnel that is configured to transfer the secondary fluid flow in a first direction, further comprising a second funnel located adjacent to the first funnel, the second funnel curving around the main conduit and configured to transfer the secondary fluid flow in a second direction opposite to the first direction;

the second funnel having a second slot that opens into the interior of the main conduit, the second slot defined at least in part by a second lip, the second slot establishing a second path for the secondary fluid flow to enter a fluid carrier upstream of the second turbine.

13. The fluid transfer system of claim 12, wherein the funnel has a cross section with an area that decreases in a direction of curvature of the funnel from at least a first position to a second position.

14. The fluid transfer system of claim 13, wherein the direction of curvature of the funnel is configured to correspond to a rotation direction of the main fluid flow.

15. The fluid transfer system of claim 12, wherein the funnel includes a divider that creates two flow paths around the funnel.

16. The fluid transfer system of claim 12, wherein the axis of the main fluid flow is a longitudinal axis.

17. An article of manufacture, comprising:

a main conduit for carrying a main fluid flow; and passageway means coupled to the main conduit for at least one of introducing a secondary fluid flow to the main conduit or removing a portion of the main fluid flow from the main conduit, the passageway means including a first passageway means and a second passageway means adjacent to the first passageway means, the first passageway means configured to carry at least one of the secondary fluid flow or main fluid flow in a first direction and the second passageway means configured to carry at least one of the secondary fluid flow or the main fluid flow in a second, opposite direction.

* * * * *